United States Patent

Post, Jr. et al.

[15] 3,674,678

[45] July 4, 1972

[54] ELECTROPHORETIC APPARATUS

[72] Inventors: Arthur H. Post, Jr., Belmont, Mass.; Ronald L. Polinsky, Hanover, N.H.; James L. Dwyer, Concord, Mass.

[73] Assignee: Millipore Corporation, Bedford, Mass.

[22] Filed: Oct. 28, 1970

[21] Appl. No.: 84,587

[52] U.S. Cl. ..........................................204/299, 204/180 G
[51] Int. Cl. .................................................................B01k 5/00
[58] Field of Search ......................................204/180 G, 299

[56] References Cited

UNITED STATES PATENTS

| | | | |
|---|---|---|---|
| 3,317,417 | 5/1967 | Raymond | 204/299 |
| 3,371,027 | 2/1968 | Paglia et al. | 204/180 G X |
| 3,407,133 | 10/1968 | Oliva et al. | 204/180 G X |
| 3,432,414 | 3/1969 | Rand | 204/180 G |
| 3,479,265 | 11/1969 | Elevitch | 204/299 X |
| 3,482,943 | 12/1969 | Csizmas et al. | 204/299 X |
| 3,494,846 | 2/1970 | Arquembourg | 204/180 G |
| 3,554,894 | 1/1971 | Zemel | 204/299 |

Primary Examiner—John H. Mack
Assistant Examiner—A. C. Prescott
Attorney—Kenway, Jenney & Hildreth

[57] ABSTRACT

An apparatus for conducting electrophoretic analysis comprising a container filled with a conductive gel, two electrodes in the container and means for effecting a voltage across the gel. The container is shaped with deep reservoirs at opposing ends and a relatively shallow mid-section having wells to accommodate a sample to be analyzed. The electrodes extend the width of the reservoirs at about the reservoir midpoint. This apparatus eliminates the need for wicks in gel electrophoresis.

8 Claims, 5 Drawing Figures

INVENTORS
ARTHUR H. POST, JR.
RONALD J. POLINSKY
BY JAMES L. DWYER

Kenway, Jenney & Hildreth
ATTORNEYS

ELECTROPHORETIC APPARATUS

Electrophoresis is a primary tool in analytic chemistry, used to separate complex mixtures of molecules into their individual components. Electrophoretic analysis is based upon the fact that each molecule is characterized by a particular electrophoretic mobility under a given set of conditions. For example, most proteins exhibit a net negative charge which is enhanced in the alkaline pH range. When a mixture of materials is placed in a support medium, such as a buffered gel, which is subjected to a voltage gradient, each component is caused to migrate through the support medium at its characteristic rate for that set of conditions. Electrophoretic mobility is a function of net charge, molecular weight, size, shape and a number of other factors which are controlled by experimental conditions.

While electrophoretic migration is negatively charged molecules is occurring, another phenomenon, known as counter-electrophoresis, or endosmosis or electro-osmosis, is also taking place. The positive ions in the buffer within the gel move toward the cathode. Polar water molecules, attracted to these positive ions, are swept along toward the cathode also. This flow of ions and water molecules toward the cathode tends to oppose the electrophoresis of negatively charged ions toward the anode. Endosmosis can be very useful, in that weakly electronegative or electrically neutral molecules will be washed toward the cathode.

By making use of both electrophoresis and endosmosis which can cause molecule movement in opposite directions, one can cause a sample containing protein molecules to move toward a reagent containing neutral or weakly charged molecules so that they encounter each other within the gel. The sample and reagent can be positioned in the gel by placing them in wells formed by cutting out and removing a small section of gel, casting the gel around plugs which are subsequently removed or by other known means. When a particular component of the sample encounters the reagent, in the proper concentrations, a reaction occurs, such as a change in color or a precipitation.

Various support media can be used, including agar gel, agarose gel, and polyacrylamide gels, so long as an appropriate buffer is provided and the gel formed by the support media and buffer exhibits endosmatic characteristics.

In present electrophoretic methods and apparatus, two large reservoirs of liquid buffer are used. These reservoirs contain buffer which may be identical with that used to make the gel and are connected to the two ends of the gel by means of wicks saturated with buffer. The electrodes that provide the voltage gradient are inserted into the buffer reservoirs. The wicks provide pathways for the movement of both buffer and electrical current. The gel in which the reaction occurs is normally 2 to 4 millimeters in thickness. The current passing through gel of this thickness is great enough to cause significant heating, the amount of heating varying proportionally as the square of the current. To prevent the loss of moisture from the gel that would result from this heating, the gel is usually kept in a humid environment. Associated with this gel thickness is also a significant flow of buffer from one reservoir to the other. The electrical resistance of the wicks and of the buffer in the reservoirs is relatively high; hence, correspondingly high voltages must be imposed upon the electrodes to produce a particular voltage gradient within the gel.

It would be highly desirable to provide an electrophoretic method and apparatus that eliminates the need for wicks, minimizes current flow through the gel and minimizes the time and power requirements needed to effect the desired migration and stratification of sample. This would permit quick sample separation and analysis without necessitating unduly cumbersome means to prevent gel drying.

It is also desirable to provide a system of the kind described which eliminates the electrophoresis tray and the substantial quantities of buffer required by the methods and apparatus heretofore available.

The present invention provides a method and apparatus for conducting electrophoretic separations and analyses. The apparatus comprises a container for a buffered gel, a buffered gel and electrodes embedded in opposing ends of the gel reservoirs. It is preferred that the gel have a vertical cross section comprising relatively deep reservoirs at opposing ends and a relatively shallow mid-section. The mid-section is provided with wells to introduce the sample to be separated into the gel and if desired, a reagent that reacts therewith. The width of the gel mid-section is minimized to increase the voltage gradient therein but without substantially increasing the risk of sample contamination or gel tearing during formation of the wells in the gel. The electrodes are placed in opposing reservoirs and are positioned and/or provided with means to permit fluid to pass through thereby enhancing endosmosis. The gel volume in the electrode reservoirs is sufficient to prevent gel drying during the time needed to effect sample separation and reaction with reagent. Also, the relatively large surface area of the electrodes used and the relatively large gel volume in the region of the electrodes minimizes the deposition of salt and other pronounced chemical changes sometimes observed when electrodes are placed in buffer solutions.

The apparatus of this invention eliminates the need for wicks and reduces the time and power needed to effect sample separation.

Figure 1:
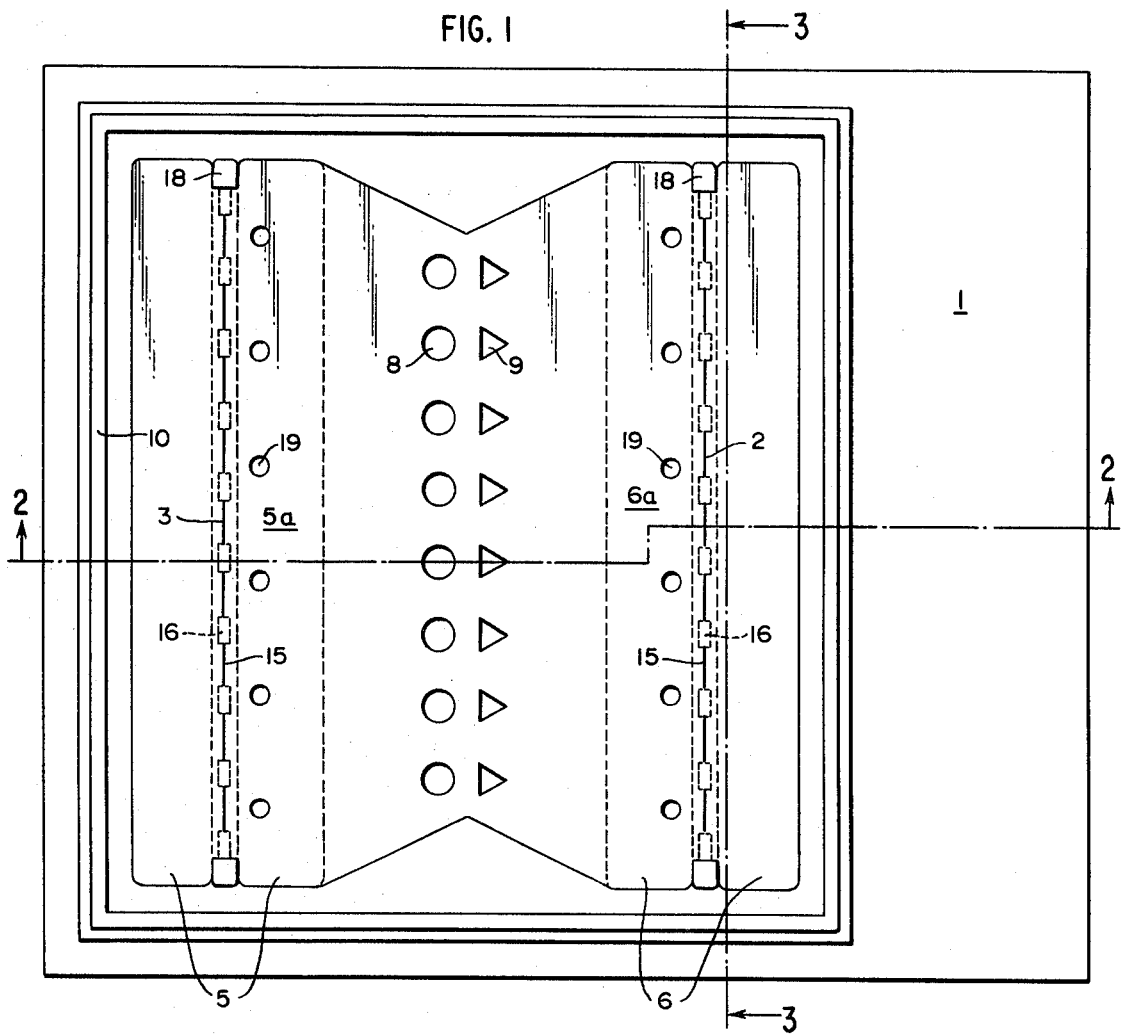
FIG. 1 is a top view of the gel and electrodes in a container.
Figure 2:
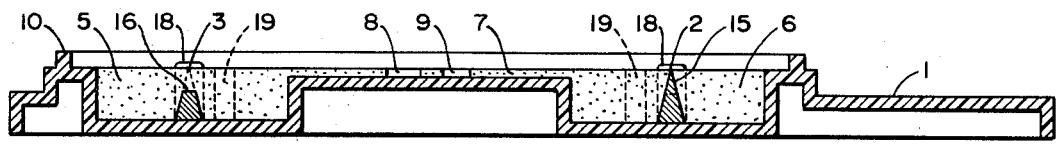
FIG. 2 is a cross-sectional view taken along line 2—2 of FIG. 1.

Referring to FIGS. 1 and 2, the electrophoretic apparatus comprises a container 1, an anode 2, a cathode 3, and a gel having three sections; namely, a cathode reservoir 5, an anode reservoir 6, and a relatively shallow mid-section 7 containing wells 8 and 9. The wells 8 and 9 extend through the depth of the gel mid-section 7. The gel is surrounded by an elevated ridge 10 comprising an integral part of the container 1 to prevent liquid from flowing from the surface 4 of the gel during electrophoresis and to prevent contact of the cover with the gel during storage.

As shown in FIG. 2, the cathode reservoir 5 and anode reservoir 6 are considerably deeper than the mid-section 7 of the gel. Furthermore, as shown in FIG. 1, the mid-section 7 has a reduced net width as compared to the cathode reservoir 5 and anode reservoir 6. It has been found that the gel configuration shown in FIGS. 1 and 2 increases the voltage gradient in the area between the well 8 and the well 9 for a given voltage between the anode 2 and the cathode 3. This reduced net width can result merely by the presence of the holes in the gel or can be augmented by the triangular shaped structures shown. Furthermore, by regulating the ratio of the gel thickness in anode reservoir 6 and cathode reservoir 5 as compared to the thickness in the mid-section 7, the total resistance between cathode 2 and anode 3 is increased. The increased voltage gradient between the sample well and the reagent well reduces the needed voltage between the electrodes and the time necessary to effect the desired migration and/or stratification of the sample tested. The increased resistance between the anode 2 and cathode 3 also reduces the current flow for a given voltage. There is a corresponding reduction in the power expended and the heat generated in the gel. The combined effect of reduced time and reduced power minimizes total endosmatic fluid transfer, water evaporation as a result of heat generation and gel drying.

The apparatus illustrated in FIG. 2 also provides substantial endosmatic fluid velocity and voltage gradient in the vicinity of the sample while minimizing such velocity and gradient elsewhere in the apparatus.

Figure 3:
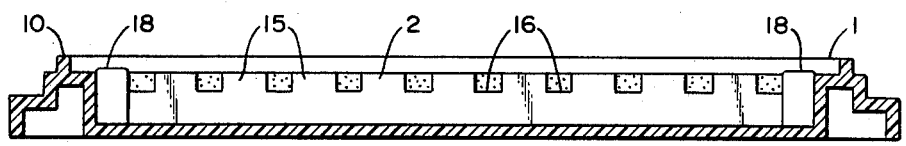
FIG. 3 is a cross-sectional view taken along line 3—3 of FIG. 1.

The anode reservoir 6 and cathode reservoir 5 have a sufficient volume to provide buffer in the mid-section 7 during electrophoresis to compensate for any fluid transfer or drying that occurs therein. The electrodes 2 and 3 which form the anode and cathode respectively, are placed generally at the midpoint of the wells 5 and 6 and have perforation 16 as best shown in FIG. 3 to permit buffer movement thru the reservoir so as to promote endosmosis. Any gas or vapor produced during electrophoresis passes through perforation 19 in the gel in areas 6a or 5a respectively. Other means can be employed to prevent gas build-up at the electrode. Thus, the electrode can be positioned away from the bottom and/or top surfaces of the gel to permit by-pass over or under the electrode. Alternatively, the electrode can be perforated by forming holes therein or by being shaped as for example as shown in FIG. 3.

The mid-section 7 should have a thickness and cross section area that prevents excessively rapid drying during electrophoresis even at the low voltages that can be employed herein but maximizes the voltage gradient therein. Generally, the mid-section 7 has a thickness between about 1 and 4mm, preferably between about 1 and 2mm. This gel surface configuration in the mid-section 7 increases the voltage gradient in the gel between the wells 8 and 9.

Referring to FIG. 3, the anode 2 comprises vertical sections 15 and perforations 16. The anode 2 is held in container 1 by any convenient means such as by being inserted in slots therein or being adhesively attached thereto, or mechanically fastened.

The container 1 can be formed from any material that does not inhibit migration or reaction. Methyl methacrylate is a particularly useful container material since it is strong and clear thereby facilitating visual observation of any precipitate or color band formed.

Any suitable electrode material can be employed so long as it is adequately wet by the gel to provide contact therewith and so long as the electrode material does not migrate into the gel during electrophoresis sufficiently to impart the efficiency of the process. Suitable materials include platinum, palladium, carbon or stainless steel.

The electrophoresis apparatus described above is particularly useful in the chemical analysis of proteins. In use, a protein mixture such as a human blood serum sample is placed in the well closest to the cathode 3 while a reagent that reacts with one blood protein is placed in the well 9 closest to the anode 2. The voltage is then applied across the electrodes to cause the proteins to migrate through the gel towards the anode. Since blood proteins, particularly globulins, have different degrees of mobility in the gel, they will become stratified in the gel between the well where the reagent is stored and the adjacent well. The hepatitis antigen, a foreign or abnormal component of the serum, also has mobility and migrates along with some of the serum globulins. The reagent on the other hand will move towards the cathode being carried by the endosmosis. After a period of time, the reagent will contact the stratified protein with which it reacts to form a precipitate that can be visually observed either with or without staining or forming a colored reaction product or other product that can be easily detected and distinguished. By using various antibody serums, the method and apparatus may be used to detect the presence or absence of normal serum proteins.

Figure 4:
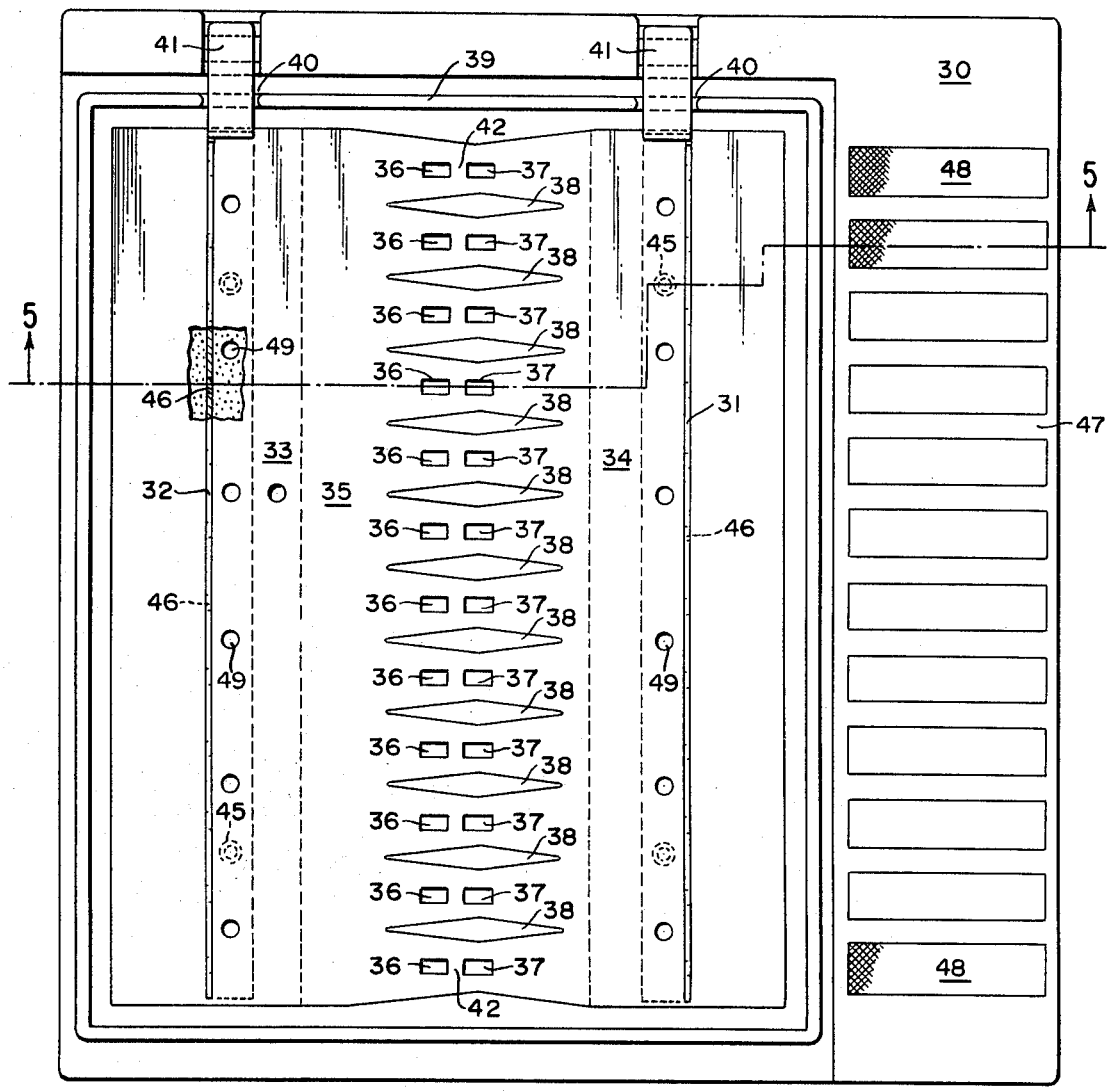
FIG. 4 is a top view of a preferred embodiment of this invention.
Figure 5:
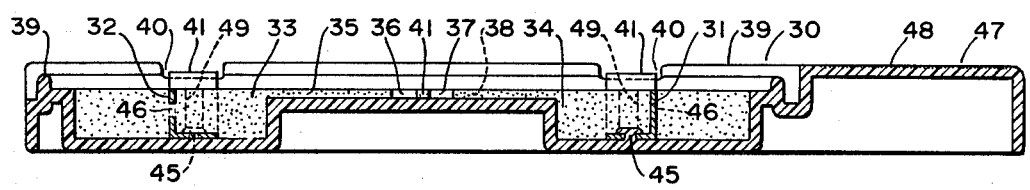
FIG. 5 is a cross-sectional view taken along line 5—5 of FIG. 4.

Referring to FIGS. 4 and 5, the electrophoretic apparatus comprises a container 30 an anode 31 a cathode 32 and a gel having three sections; namely, a cathode reservoir 33, an anode reservoir 34 and a relatively thin mid-section 35 containing two rows of wells 36 and 37. The container 30 at the mid-section 35 also has a diamond shaped raised portion between each pair of wells 36 and 37. The raised portion 38 reduces the cross sectional area of the gel in the area of the wells 36 and 37 thereby increasing the voltage gradient in that area of the gel. The gel is surrounded by an elevated ridge 39 having depressions 40 at each electrode so that electrode extensions 41 can be fit easily into the container 1. The material being separated and the reagent therefor are placed in the wells 36 and 37. In the case of samples containing electronegative molecules, the sample is placed in the row 37 while the agent to be moved through the gel by endosmosis is placed in the wells 36. Precipitation of the sample occurs in the space 42 between the row 36 and 37. The electrodes 31 and 32 have an 'L' shaped cross section and are adapted to be fit over posts 45 when placed in the container 1. The anode 31 and cathode 32 each have an extension 41 that fits into the slot 40 of the container so that they can be connected to a suitable source of electrical power. Each of the electrodes 31 and 32 has holes 46 along its length to permit endosmosis. Holes in the gel 49 above the electrodes permit the escape of gases and vapors that form during electrophoretic analysis. This prevents gas build-up at the electrode thereby preventing separation of the gel and electrode. The flat portion 47 has roughened sections 48 corresponding to each set of wells to permit writing information thereon concerning the sample.

In use, the electrophoresis apparatus of this invention requires a lower voltage than is required with present electrophoresis apparatus. For example, in testing blood serum for hepatitis, satisfactory results have been obtained at about 18 volts DC. This is compared with a typical voltage of about 350 volts for conventional apparatus. These results are obtained when the blood serum and reagent holes are separated with about 3mm. of gel to obtain a precipitate line about 1mm. away from the reagent well.

The gel buffer, its pH, and its strength can vary according to the materials being tested and are well known. For example, a typical gel composition employed when testing for hepatitis comprises 1.0 percent solution of agarose containing 0.05 ionic strength sodium barbital buffer at a pH of 8.6.

The apparatus is prepared by pouring the proper quantity of an aqueous gelable solution into the container and allowing it to gel. The container can have any configuration so long as the reservoirs are relatively deep and the mid-section is shallow. The mid-section can have the same width as the wells, but the embodiment shown in the figures is preferred. The wells can be formed by cutting or by pourting the solution around removable pieces integral with the containers which are removed after the solution has gelled.

The minimum reservoir volume employed depends upon the time needed to effect separation of the particular composition being analyzed. In those instances when quick separation occurs, the gel can comprise a flat sheet with the electrodes embedded therein at opposing ends.

What is claimed is:

1. An apparatus for conducting electrophoretic analysis comprising a hollow container, said container having deep reservoirs at opposing ends and a relatively shallow mid-section between said reservoirs, a continuous solid electrically conductive gel filling said reservoirs and covering said mid-section with a relatively thin layer thereof, said gel remaining in a solid condition during use of the apparatus for conducting electrophoretic analysis, and an electrode embedded within the gel in each of said reservoirs.

2. The apparatus of claim 1 wherein said electrodes are provided with means to prevent gas build-up at the electrode and to promote endosmosis.

3. The apparatus of claim 1 wherein wells in the mid-section of said gel are arranged in two separated parallel rows, the wells in each row being equidistant from an adjacent reservoir.

4. The apparatus of claim 2 wherein the net width of the gel mid-section between the rows of perforations is less than the width of the gel in each reservoir.

5. The apparatus of claim 1 wherein the container is transparent.

6. The apparatus of claim 1 wherein the container has walls extending above the surface of said gel and a water impermeable cover adapted to enclose the container.

7. The apparatus of claim 1 wherein the gel in the reservoirs adjacent the electrodes is perforated to permit escape of gases during electrophoresis.

8. The apparatus of claim 1 wherein the container has raised sections between adjacent wells in each row.

* * * * *